United States Patent [19]
Conley et al.

[11] 4,067,411
[45] Jan. 10, 1978

[54] VEHICLE EMERGENCY ALARM AND STOP SYSTEM

[76] Inventors: Thomas R. Conley, Rte. 2, Watkinsville, Ga. 30677; Larry Dawson, 200 Dove Drive, Athens, Ga. 30601; Troy Strickland, Danielsville Road, Danielsville, Ga. 30633

[21] Appl. No.: 690,380

[22] Filed: May 27, 1976

[51] Int. Cl.² .................. B60R 25/04; B60R 25/08
[52] U.S. Cl. ........................ 180/114; 307/10 AT; 340/63; 343/902
[58] Field of Search ............... 180/114, 98, 105 R, 180/103 B, 103 F; 340/63, 65; 307/10 AT; 343/901, 714, 713, 902

[56] References Cited

U.S. PATENT DOCUMENTS

| | | | |
|---|---|---|---|
| 1,343,049 | 6/1920 | Geraghlty | 180/114 X |
| 1,730,526 | 10/1929 | Pancoast | 180/114 |
| 2,265,524 | 12/1941 | Fruth | 180/110 X |
| 2,294,362 | 9/1942 | Brach | 343/901 X |
| 2,840,795 | 6/1958 | Yun Gee | 340/63 |
| 3,022,420 | 2/1962 | Brinkerhoff | 343/714 X |
| 3,112,004 | 11/1963 | Neaville | 180/98 |
| 3,515,442 | 6/1970 | Whittemore | 180/114 X |
| 3,618,067 | 11/1971 | Deuale | 180/114 X |
| 3,668,675 | 6/1972 | Joens | 340/65 X |
| 3,700,063 | 10/1972 | Dunseath | 180/114 |
| 3,703,714 | 11/1972 | Andrews | 340/63 X |
| 3,763,954 | 10/1973 | Permut | 180/98 |
| 3,790,933 | 2/1974 | Cort | 340/63 |

Primary Examiner—Joseph F. Peters, Jr.
Assistant Examiner—John A. Pekar
Attorney, Agent, or Firm—Jones, Thomas & Askew

[57] ABSTRACT

A vehicle emergency control system which remotely signals the unauthorized operation of a suitably-equipped vehicle, and which conditions the vehicle by remote control to be involuntarily retarded or stopped by an action of the unauthorized operator. Vehicles are equipped with a transmitter which broadcasts an emergency condition message in response to an unauthorized or emergency situation. The emergency message identifies the vehicle, and may also identify the nature of the emergency condition. The emergency message is received at a central location, from which a coded command signal can be transmitted to a receiver in the vehicle to disable the operation of the particular vehicle from which the emergency message emanated. The command signal conditions the brake accelerator, or some other vehicle control to be retained in a retarded position when that control is next operated. The vehicle emergency system also includes a concealed antenna which automatically becomes extended when the vehicle emergency system is operated.

6 Claims, 4 Drawing Figures

VEHICLE EMERGENCY ALARM AND STOP SYSTEM

This invention relates in general to emergency alarm systems and in particular to an emergency alarm system for use with vehicles.

Unauthorized entry into parked vehicles and the unauthorized operation of vehicles presents a continuing problem to law enforcement authorities and to the authorized owners and operators of vehicles. Trucks and other vehicles are frequently stolen from parking areas, or are hijacked on the road for the cargo which they carry, situations which are obviously hazardous to the vehicle authorized operators. Even more dangerous to drivers are situations where a vehicle is commandeered by a deranged person whose actions cannot be rationally predicted.

It is known in the art to equip vehicles with an alarm system which includes a radio alarm transmitter within the vehicle. Unauthorized tampering with the vehicle, or operation of a secret alarm switch by the authorized operator of the vehicle, causes a signal to be transmitted from the vehicle to alert others to the intrusion or other unauthorized situation. It is also known in the art to provide vehicles with intrusion alarm systems which operate, in response to unauthorized entry into the vehicle, to disable the vehicle by techniques such as interrupting the fuel supply, vehicle the electrical system, or the like. Such systems of the prior art do not, however, provide a system in which a vehicle which is underway, under control of an unauthorized occupant, can be involuntarily stopped or retarded by the vehicle operator as he normally operates vehicle controls such as the brake or accelerator.

Accordingly, it is an object of the present invention to provide an improved vehicle emergency alarm and stop system.

It is another object of the present invention to provide a vehicle emergency alarm and stop system which causes a vehicle to be stopped or retarded in a controlled manner when the vehicle operator normally intends to slow down the vehicle.

It is another object of the present invention to provide a vehicle emergency alarm and stop system which permits selective emergency message signaling from the vehicle.

It is still another object of the present invention to provide an improved antenna system for a vehicle emergency alarm and stop system.

Stated in general terms, the present invention includes a transmitter which is carried by a vehicle and which is actuated by one or more emergency conditions within the vehicle to transmit an alarm signal. A signal receiver located remotely of the vehicle receives alarm signals from suitably equipped vehicles, so that a stop command signal can be transmitted for reception by a receiver in the vehicle. The vehicle includes means which operates in response to a received stop command signal to condition a control function of the vehicle to be retained in a retarded position at the subsequent control of the vehicle operator. Stated somewhat more specifically, the received stop command signal conditions a control function such as the brake system or accelerator of the vehicle so that the selected control function, when momentarily retarded by the operator to slow down the vehicle, cannot subsequently be returned to a condition which does not retard the vehicle. Selection of the particular emergency-condition vehicle for operation by the stop command signal is accomplished by an antenna on the vehicle which becomes operative only in response to an emergency situation, or alternatively by coded stop command signals.

The objects and advantages of the present invention will become more readily apparent from the following description of a preferred embodiment as shown in the drawings, wherein.

Figure 1:
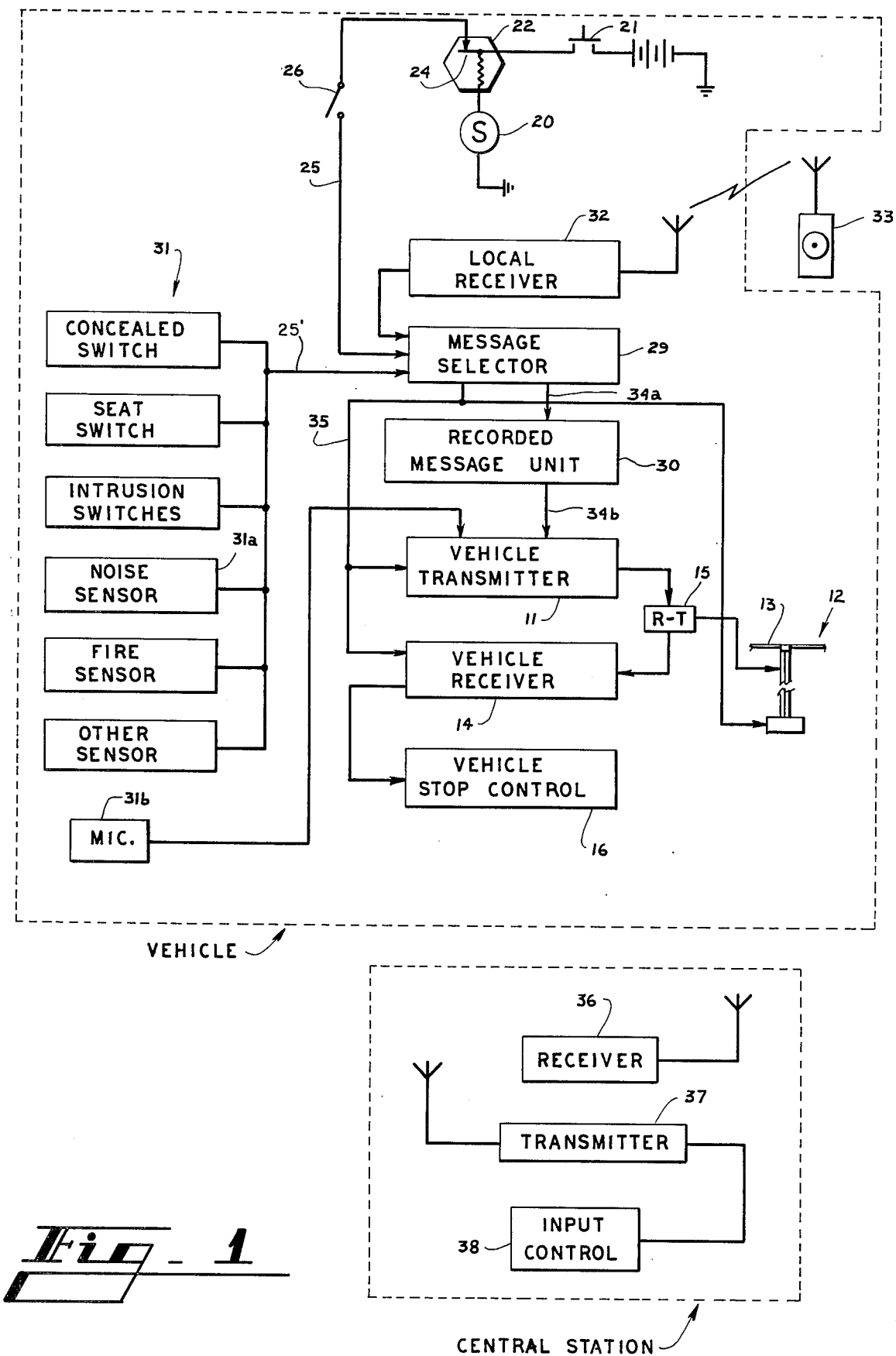
FIG. 1 shows an overall diagrammatic view of the disclosed embodiment of a vehicle emergency alarm and stop system according to the present invention.

Turning first to FIG. 1, there is shown generally at 10 a vehicle emergency alarm and stop system which includes a first designated portion which is carried by any appropriate vehicle, and a second designated portion which is situated at a central station or other location remote from the vehicle. Although only a single vehicular portion is shown in FIG. 1, it is within the scope of the present invention to provide a system in which a single central station is used in connection with a number of separate vehicles containing alarm and stop systems.

The vehicle includes an RF transmitter 11 which, when actuated as described below, transmits signals through the antenna 12 which may be concealed beneath the body surface 13 of the vehicle, when not in use. The vehicle receiver 14 is connected to receive signals from the antenna 12, as supplied through the receive-transmit switch 15 which protects the receiver 14 from RF energy the transmitter 11 operates. The output of the vehicle receiver 14 is supplied to the vehicle stop control 16, which is described below in detail.

the vehicle transmitter 11 is energized to transmit a predetermined signal whenever an unauthorized or emergnecy condition is sensed by any of one or more condition sensing means associated with the vehicle. For example, operation of the vehicle starter motor 20 by closing the starter switch 21 causes current to flow through the current-responsive device 22, known as an amp trap, which closes the switch 24 and applies a signal along the line 25. The switch 26 in the line 25, which is preferably a key-operated switch mounted in concealment on the vehicle, can be opened to disable the starter-operated alarm circuit for authorized vehicle operation. The signal on the line 25 is supplied to the message selector 29, which provides a message selection signal to the recorded message unit 30.

The recorded message unit 30 is provided by a suitable tape playback device for playing one or more prerecorded messages in response to the appropriate input signal from the message selector. Each prerecorded message contains a verbal identification of the particular vehicle in which the apparatus is installed, including such information as the vehicle make, style, and color, the license plate number of the vehicle, and other appropriate information. While the recorded message unit 20 may contain only a single prerecorded message which contains the foregoing or other information and which is actuated in response to any detected emergency condition, the recorded message unit may alternatively contain a plural number of recorded audio messages corresponding to different types of emergency conditions. By way of example, separate message tapes may be provided for hijack situations where the threat of personal injury is apparent but is not the primary motive for the intrusion, for situations where the intruder is bent on rape or other situations where personal injury is the primary motive, and for vehicle emergency situations such as fire, collision, or the like.

The message selector 29 receives inputs along collective line 25' from a number of designated switches and sensors indicated generally at 31, and the message selector may contain conventional logic circuits which supply an output signal on the line 34a to select one of plural available message tapes (or message tracks on a tape) in response to an input from the appropriate source 31 or from the unauthorized-start line 25. The selected audio message from the message unit 30 is supplied on line 34b to modulate the vehicle transmitter 11, which is turned on by a signal on the line 35 for a time sufficient to transmit the selected message. It will be understood by those skilled in the art that coded messages can be supplied from the message unit 30 to modulate the vehicle transmitter, in place of audio messages.

The vehicle apparatus can be equipped with a local receiver 32 which provides an emergency condition input to the message selector 29 in response to a signal received from the portable transmitter 33. The portable transmitter 33 is intended to be carried by the authorized operator of the vehicle when the operator leaves the vehicle unattended, so that an operator who witnesses an attempted break-in or other emergency relating to the unattended vehicle can activate the emergency alarm apparatus within the vehicle by remote control from the portable transmitter 33. The portable transmitter 33 and local receiver 32 preferably operate on a different frequency from the vehicle transmitter 11 and vehicle receiver 14, and the portable transmitter should preferably have a relatively short effective range.

It will now be understood that any one of selected emergency conditions causes the vehicle transmitter 11 to transmit an alarm signal which identifies the particular vehicle, and which may also identify the type of emergency condition. This alarm signal is picked up by the receiver 36 within the central station, which may be operated by a lawenforcement agency or by a private security organization. When a signal is received from a vehicle indicating that the vehicle is being hijacked, for example, the central station transmitter 37 is operated through the input control 38 to transmit a command message to the vehicle receiver 14, from which the vehicle stop control 16 is actuated. Since a single central station may be within transmitting range of a number of vehicles which are equipped with emergency alarm and stop systems according to the present invention, it may be desirable to provide an input control 38 which modulates the transmitter 37 with a predetermined coded signal which is selected by an operator at the central station, and which uniquely corresponds to decoding circuitry associated with the receiver 14 of the particular individual vehicle that was identified in the message received at the central station. Such coded selective calling equipment is well-known to those skilled in the art. As an alternative to transmitting coded signals from the central station, however, the receiver 14 within the vehicle may be operative by a signal on line 35 to receive signals only when an emergency condition exists for that vehicle. Moreover, a system using a concealed antenna of the type described below will be able to receive signals from the central station only when the antenna has been extended in response to an emergency alarm signal. Thus, other similarly-equipped vehicles within radio range of the central station are unaffected by command signals transmitted from the central station.

Figure 2:
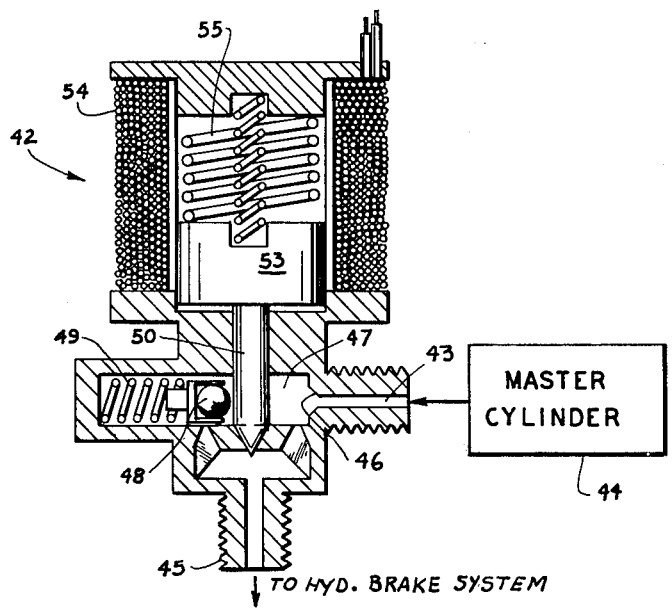
FIG. 2 shows a disclosed embodiment of braking system stop control used with the disclosed embodiment.

One example of apparatus embodied by the vehicle stop control 16 is shown by the brake stop conditioning valve indicated generally at 42 in FIG. 2. The stop conditioning valve has an inlet port 43 which is connected to the discharge port of a conventional hydraulic-brake master cylinder 44, and an outlet port 45 which is connected to the individual wheel cylinders of the vehicle brake system. It will be understood that the stop conditioning valve is readily installed in the fluid line of a conventional vehicle brake system. A chamber 47 is located within the stop conditioning valve 42, and a check valve seat 46 is provided where the fluid inlet port 43 enters the chamber. A ball check valve 48 is urged toward the check valve seat 46 by the spring 49, with the check valve 48 being normally maintained away from the check valve seat by the plunger 50. The stop conditioning valve 42 is shown in unactivated condition in FIG. 2, wherein two-way fluid flow between the master cylinder 42 and the remainder of the brake system is permitted through the chamber 47.

The plunger 50 is connected to the solenoid armature 53 mounted within the solenoid coil 54. The solenoid 53 and the attached plunger 50 is normally maintained in the position shown in FIG. 2 by the spring 55. The solenoid coil 54 is actuated in response to a signal from the vehicle receiver 14, however, thereby moving the armature 53 upwardly and withdrawing the plunger 50 from the normal position blocking the ball check valve 48. The check valve 48 is forced against the check valve seat 46 by the spring 49. The solenoid coil 54 may, if desired, be provided with a suitable latching circuit of the type known in the art to maintain energization in response to a momentary signal from the vehicle receiver 14.

While the foregoing operation of the stop conditioning valve 42 in response to a signal from the vehicle receiver 14 does not apply pressure to the brake system of the vehicle, it will be understood that the next operation of the brake system forces braking fluid from the master cylinder through the check valve 48 to apply the vehicle brakes to an extent undetermined by the pedal pressure applied to the master cylinder. When the pedal pressure is released, however, that braking pressure within the braking system is maintained by the ball check valve 48 so that the vehicle brakes remain applied. Subsequent braking efforts, such as pumping the brake pedal, only increase the accumulated pressure within the braking system, thereby further retarding operation of the vehicle. Accordingly, it is seen that the signal received at the vehicle receiver 14 from the central station has the effect of conditioning the vehicle to be retarded whenever the unauthorized operator of the vehicle next applies the brakes in the normal course of driving.

Figure 3:
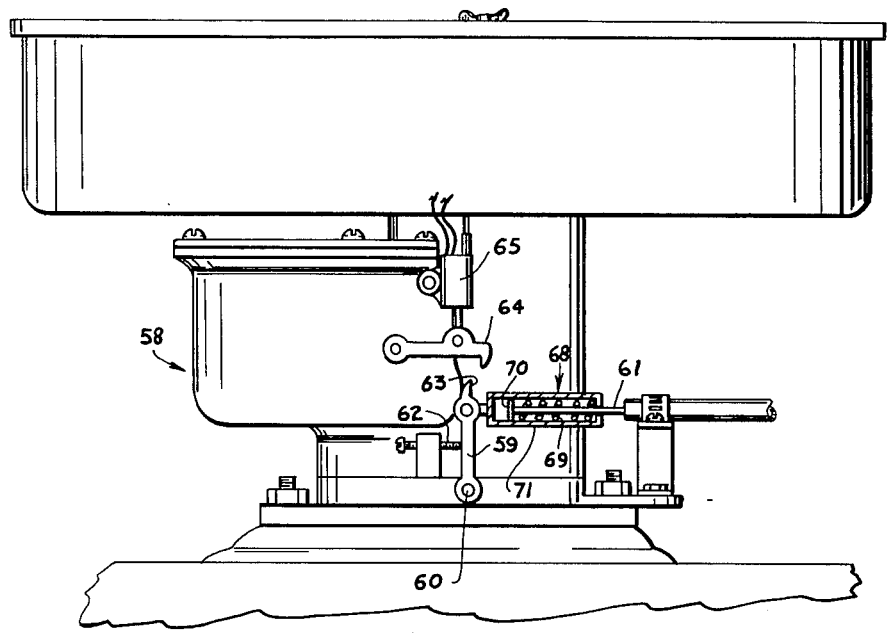
FIG. 3 shows a disclosed embodiment of throttle latch stop control according to the present invention.

Turning to FIG. 3, there is shown another embodiment of vehicle stop control which affects the vehicle throttle system and which is similarly conditioned for operation whenever the vehicle operator momentarily releases the accelerator.

A conventional vehicle carburetor is shown at 58 and includes a throttle arm 59 which is connected to rotate a butterfly valve shaft 60. The throttle arm 59 is connected to the vehicle accelerator by a conventional linkage such as the flexible cable 61, so that the throttle arm 59 is moved away from the idle stop 62 to open the throttle whenever the accelerator is depressed.

The throttle arm 59 is provided with a latch surface 63 at an upper end. A latch member 64 is mounted above the latch surface 63 of the throttle arm, with the latch member being normally maintained out of engagement with the throttle arm 59 by the unactuated solenoid 65.

Connected between the accelerator cable 61 and the throttle arm 59 is an elastic connection 68, provided by a compression spring 69 contained between the enlarged end 70 of the cable and the hollow housing 71 attached to the throttle arm. The tension of the spring 69 is sufficient to cause the throttle arm 59 to follow movements of the cable 61 without compression of the spring, as long as the latch member 64 is maintained in the unlatched position depicted in FIG. 2.

The solenoid 65 is connected to be activated in response to an output signal from the vehicle receiver 14, so that the latch member 64 is lowered into engagement position with the latch surface 63 of the throttle arm 59. Assuming that the vehicle is operating under at least partial throttle at a time when the solenoid 65 is actuated to lower the latch member 64, the throttle arm 59 is at that time displaced to the right of the latch member (as viewed in FIG. 3) by the cable 61, so that operation of the throttle is immediately unaffected by the signal from the vehicle receiver 14. As soon as the unauthorized operator of the vehicle momentarily releases the accelerator, however, the throttle arm 59 is returned to the position shown in FIG. 3 and the latch surface 63 is engaged by the latch member 64. Subsequent attempts to operate the vehicle accelerator will result only in compressing the spring 69 of the elastic connection 68, however, since the throttle arm 59 is maintained in idle position by the latch member 64. The vehicle will thus coast to a stop or, alternatively, will be limited to a predetermined maximum speed, despite efforts of the unauthorized operator to accelerate the vehicle.

It will be apparent that a particular vehicle can be equipped with both a throttle stop, such as shown in FIG. 3, and a brake stop conditioning mechanism, such as the valve shown in FIG. 2, so that forward movement of the vehicle is conditioned to be retarded whenever the unauthorized operator either operates the brakes or releases the accelerator, or does both. Accordingly, a signal from the vehicle receiver 14 serves to condition the braking and/or throttle systems to retard the vehicle whenever the operator subsequently operates the brakes and/or releases the accelerator, both of which are operatorcontrolled events which occur in the normal course of driving. The present system thus prevents or greatly reduces the chance of collision or other accident which might occur if the brakes were instantaneously applied or the vehicle engine were instantaneously stopped by a signal from the vehicle receiver 14, received from the central station.

Figure 4:
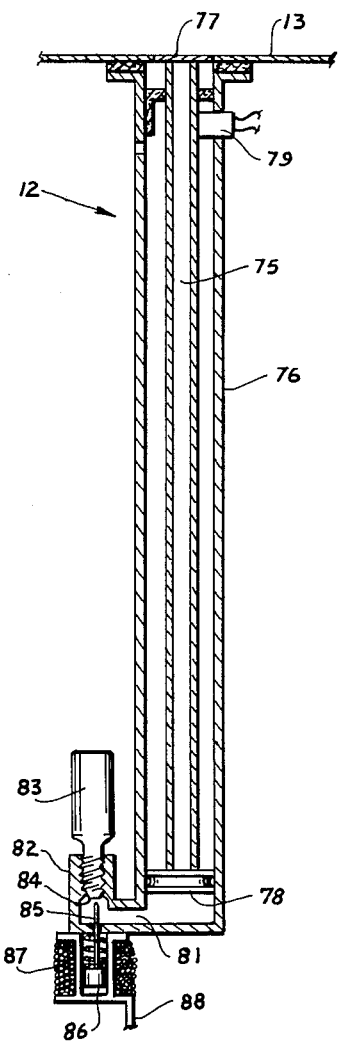
FIG. 4 is a partially-sectioned view of a concealed antenna system according to the disclosed embodiment.

Details of the concealed antenna 12 are shown in FIG. 4. An antenna rod 75 is telescopically received within the hollow cylinder 76 which is mounted beneath the body surface 13 of the vehicle. The outer end of the antenna rod 75 may be provided with a plug 77 which fits flush within a corresponding opening in the body surface 13, so as to further conceal the presence of the antenna on the vehicle. The inner end of the antenna rod 75 is attached to a piston 78 which makes fluidtight sliding contact with the inside of the cylinder 76. An electrical RF signal connection with the slidable antenna rod 75 is provided at 79.

The inner end of the cylinder 76 terminates at a conduit 81 which is located below the lowermost position of the piston 78, and which is connected to a housing 82. A container 83 of a suitable compressed gas is attached to the housing 82. The gas container 83 is normally maintained closed by a rupturable seal 84 which is aligned with the pin 85 attached to the armature 86 of a solenoid 87. The solenoid 87 is connected by the line 88 to be energized by the message selector 29 (FIG. 1) whenever an emergency condition is detected.

The antenna rod 75 is normally maintained within the cylinder 76 in the completely concealed position depicted in FIG. 4, so that the presence of an emergency signaling antenna on the vehicle is effectively disguised. In this manner, the emergency signaling antenna cannot be broken or otherwise disabled by attackers as a prelude to a hijack attempt. Whenever an emergency condition is detected as aforementioned, however, the solenoid 87 is energized to force the pin 85 against the seal 84. The compressed gas within the container 83 is thereby released and forces the piston 78 upwardly within the cylinder 76 to raise the antenna rod 75 to its full extent outwardly of the vehicle body 13. The antenna is now operatively positioned for use by the vehicle transmitter 11 and the vehicle receiver 14. The concealable antenna 12 is preferably located on the vehicle at an area which will suffer little or no damage in case of a vehicle accident, so that the system can be operative when an accident has occured.

It will be understood, of course, that other types of concealed or nonconcealed antennas may be used in conjunction with the vehicle emergency alarm and stop system disclosed herein.

The condition sensing means shown at 31 in FIG. 1 are not intended to be inclusive, and those skilled in the art will recognize that other sensing means can be provided to initiate the alarm signal. Sensors such as the intrusion switch and the seat switch can be connected in series with a disabling switch, such as the previously-mentioned switch 26, which allows the sensors to be "armed" for operation only when the vehicle is unattented. A concealed switch may be provided at an unobtrusive location known only to authorized operators of the vehicle. A fire sensor can also be included so as to provide an alarm signal in response to one or more conditions which indicate a fire within the vehicle. Such condition sensing devices are known to those skilled in the art, and it will be apparent that a particular vehicle installation according to the present invention can be equipped with individual sensing devices which will respond to several different types of emergency conditions. The noise sensor 31a may operate to trigger the message selector in response to a sudden loud noise and/or air pressure change which would be caused by discharging a firearm within the confined volume of a vehicle A concealed microphone 31b can also be provided, if desired, to transmit live audio from the vehicle by way of the vehicle transmitter 11, so that an emergency situation within the vehicle can be assessed at the central station.

It will be seen from the foregoing that the present vehicle emergency alarm and stop system enables a stop system so that a control stop is subsequently accomplished by an act of the unauthorized operator. Furthermore, controlled stopping of the vehicle is accomplished promptly and without the risk of a high-speed pursuit of the vehicle by law-enforcement officers, so that the vehicle and its occupants can be promptly rescued.

It will be apparent that the foregoing relates only to a preferred embodiment of the invention, and that numerous alterations and modifications may be made therein without departing from the spirit and the scope of the invention as defined in the following claims.

We claim:

1. An emergency disabling system for a vehicle having an operator actuated motion control means, said system comprising:
   first transmitting means mounted on said vehicle for transmitting an alarm signal;
   first receiving means at a location remote from said vehicle for receiving said alarm signal;
   second transmitting means at said second location for selectively transmitting a command signal;
   second receiving means mounted on said vehicle for receiving said command signal; and
   means mounted on said vehicle and responsive to said received command signal for conditioning said motion control means for retention in a motion retarding position brought about by said operator.

2. System as in claim 1, wherein said motion control means includes:
   one-way retaining means connected to an operator control member of said motion control means and operable in response to said received command signal to retain said control member in an operative position which retards operation of said vehicle.

3. System as in claim 1, further comprising:
   means associated with said vehicle to provide an emergency control signal which turns on said first transmitting means;
   antenna means which is operatively connected to said first transmitting means and said second receiving means, and which is normally maintained in inoperative concealed position on said vehicle; and
   means responsive to said emergency control signal to move said antenna means from said concealment to an operative signaling position whereby said antenna means can radiate signals from said first transmitting means and receive signals from said second transmitting means.

4. System as in claim 1, wherein said motion control means comprises a fluid brake system, and check valve means connected in the fluid braking system and operative to retain operator-applied brake actuating fluid pressure conditions in response to said received command signal.

5. System as in claim 1, wherein said motion control means comprises a throttle mechanism, and latch means operative to engage and limit the throttle mechanism so as not to exceed a predetermined maximum throttle operation, in response to said received command signal.

6. System as in claim 5, further comprising elastic connective means in said throttle mechanism between said latch means and the accelerator pedal of said vehicle to permit said accelerator pedal to undergo a normal range of movement when said throttle mechanism is engaged by said latch means.

* * * * *